Sept. 27, 1955  W. C. SCHIERMAN  2,718,837
DEPTH GAGE ATTACHMENT FOR PLOWS
Filed Aug. 3, 1951

INVENTOR
WALDO C. SCHIERMAN

BY

HIS ATTORNEY

United States Patent Office 2,718,837
Patented Sept. 27, 1955

2,718,837

DEPTH GAGE ATTACHMENT FOR PLOWS

Waldo C. Schierman, Lancaster, Wash.

Application August 3, 1951, Serial No. 240,181

3 Claims. (Cl. 97—189)

This invention relates to a depth gage attachment for plows, and has for one of its objects the production of a simple and efficient means for preventing the plow shares of a plow from digging into the soil beyond a selected depth as set by the position of the depth gage wheel.

A further object of this invention is the production of a simple and efficient attachment for connecting the rear furrow wheel with the depth gage wheel for limiting the plowing depth of a plow and providing a two point support or suspension rearwardly of the power lift wheels, to prevent up and down swinging movement of the plow upon the power lift wheel supporting shafts.

Other objects and advantages of the present invention will appear throughout the following specification and claims.

Figure 1:
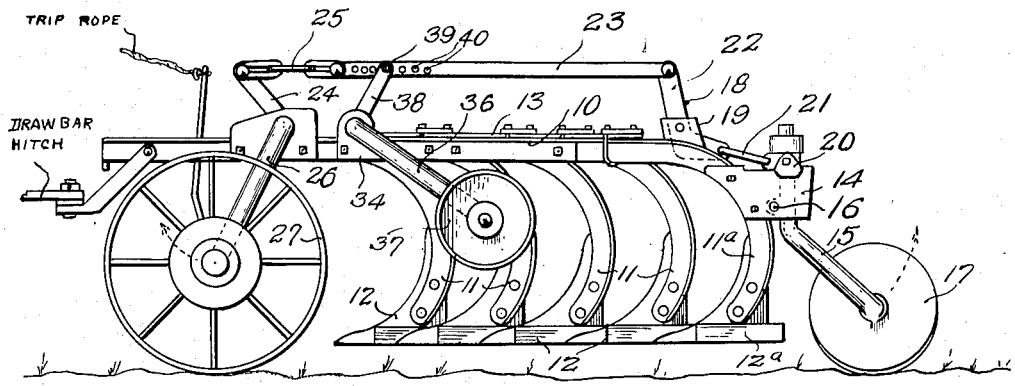
Figure 1 is a side elevational view of a plow and the improved attachment, the plow shares being raised to an inoperative position.

By referring to the drawing in detail, it will be seen that 10 designates a conventional plow frame which comprises a plurality of laterally spaced plow beams 11, each of which carries a plow share 12. Any number of plow beams and shares may be used and the beams are connected and braced transversely by means of the conventional bar 13. The type of plow illustrated is the "International No. 10 Five Bottom Plow," certain parts being eliminated from the drawing to simplify the illustration. The beam on the left of the plow is designated as 11ª and the plow share carried thereby is designated as 12ª.

Figure 2:
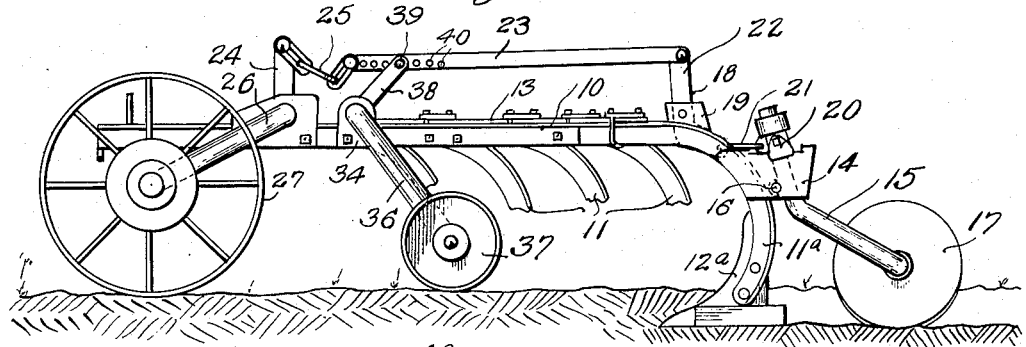
Figure 2 is a side elevational view of the plow with the shares and depth gage in an operative position.

A wheel box 14 is carried near the rear end of the beam 11ª upon which the furrow wheel supporting arm 15 is pivotally mounted, as at 16. A back furrow wheel 17 is carried by the outer end of the arm 15, as shown in Figures 1 and 2. A bell crank lever 18 is pivotally secured near the rear end of the beam 11ª upon a suitable bracket 19 and is connected at one end to the upper end of the arm 15 by a suitable connection 20 of the conventional type, through the medium of an element 21. The lever 18 is provided with an upwardly extending end 22 to which is pivotally connected the rod or bar 23. The forward end of the rod 23 is connected to the crank arm 24 by means of a flexible connection such as the links 25. The crank arm 24 is carried by the shaft or axle 26 of the power lift wheel 27. The conventional hitch and trip rope of the usual type are also provided, as shown.

Figure 3:
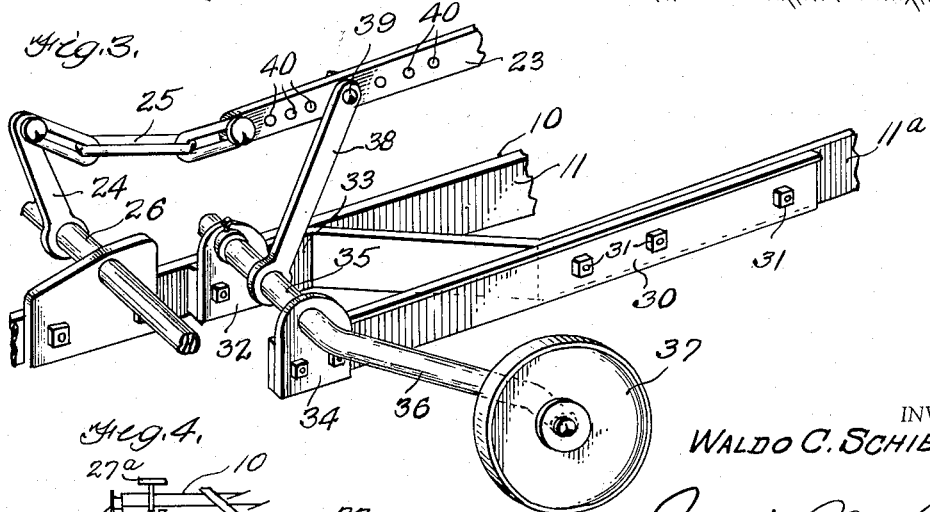
Figure 3 is a detail perspective view of the improved attachment, a portion of the plow frame being shown.

All of the structure above described is of the conventional type known as "International No. 10 Five Bottom Plow," and my invention consists of an attachment which is illustrated in detail in Figure 3 and is described in the following:

An extension arm 30 of a suitable type is secured to the beam 11ª by means of suitable bolts or other anchoring means 31 and projects forwardly. An upstanding journal plate 32 is carried by the beam 11 adjacent the beam 11ª and preferably overlies the off-set end 33 of the beam 11ª where it is anchored to the beam 11, as shown in Figure 3. A second upstanding journal plate 34 is carried by the forward end of the extension arm 30 in transverse alignment with the journal plate 32. A depth gage axle 35 is journalled upon the plates 32 and 34 and is provided with an angularly extending depending depth gage wheel supporting arm 36. A depth gage wheel 37 is carried by the extremity of the arm 36. An upstanding actuating arm 38 is fixed to the axle 35 and the upper end of the arm 38 is adjustably secured to the forward end of the rod 23 by means of a suitable anchoring bolt or other means 39 which selectively engages the aligned apertures 30 formed in the forward end of the rod 23.

Figure 4:
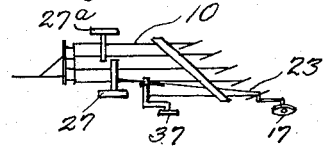
Figure 4 is a diagrammatic plan view of the two power lift wheels of a conventional plow upon which the present attachment is used.

The purpose of the present attachment is to hold the plow shares 12 and 12ª of the plow at a desired or selected depth and to thereby prevent the plow shares from plowing deeper than the depth gage wheel 37 will allow. The large power lift wheels, such as the wheel 27 shown, acting in conjunction with the furrow wheel 17, lifts the plow shares out of the ground to the position shown in Figure 1 when desired. The plow frame comprising the parallel plow beams and associated parts under ordinary conditions, without the depth gage, will rock on the supporting axles of the power lift wheels, such as the axle 26 of the wheel 27, since the draw bar or hitch is hinged to the plow, thereby allowing this up and down swinging movement of the plow. The plow is provided with two power lift wheels 27 and 27ª, as is shown in the diagram Figure 4, this being the conventional structure.

With the addition of the depth gage wheel 37 and its connection to the furrow wheel 17 through the medium of the bar 23 and associated parts, the plow shares 12 and 12ª will not dig into the soil at a greater depth than the wheel 37 will permit, as is often the case where a proper depth gage is not provided. The furrow wheel 17 serves a double purpose in association with the wheel 37, since the wheel 17 by supporting the weight of the rear of the plow and the resulting pressure caused thereby will swing the arm 22 of the bell crank lever 18 rearwardly. This action will pull upon the bar 23 and swing the arm 38 rearwardly and bring the depth gage wheel 37 in contact with the surface of the ground in advance of the plow share 12ª. The plow frame 10 will thereby be supported by two point suspension rearwardly of the power lift wheel 27 as shown in Figure 2, and prevent the frame from up and down swinging action on the axle 26. This will hold the plow shares at a desired or selected depth and prevent the plow shares from digging into the soil below a selected depth, as would occur if this up and down swinging action did occur.

A very simple and efficient attachment has been provided which may be mounted upon a conventional type of plow illustrated to provide a depth gage to hold the plow shares in a selected position against digging deeper than the depth gage wheel 37 will allow. This is largely accomplished by means of the bar 23 which connects the operating elements of the wheels 17 and 37 together, as shown.

It should be understood that certain detail changes in mechanical structure may be employed within the spirit of the present invention, so long as these changes fall within the scope of the appended claims.

Having described the invention, what I claim as new is:

1. A gage wheel structure of the class described comprising a frame, plow elements carried by said frame, an extension carried by and projecting laterally of and parallel to said frame, a depth limiting means carried by said frame and extension, said depth limiting means comprising a depth gage axle journaled upon said frame and said extension, an angularly extending depending depth gage wheel supporting arm carried by said axle laterally of said extension, a depth gage wheel journaled upon the extremity of said arm, an upstanding actuating arm fixed to said axle, a furrow wheel supporting means mounted for upward and downward movement upon the rear of said frame, a furrow wheel carried by said furrow wheel supporting means, a bell crank lever carried by said frame and connected to said furrow wheel supporting means, a bar connecting said bell crank lever to said upstanding actuating arm of said depth limiting means to lower said depth gage wheel as said furrow wheel is elevated and to raise said depth gage wheel as said furrow wheel is lowered, and means for adjusting the connection to said bar with said upstanding actuating arm to regulate the cutting depth of the plow elements carried by said frame.

2. An apparatus of the class described comprising a frame, plow elements carried thereby, an extension carried by and extending laterally of and substantially parallel to said frame, a depth gage crank axle journaled transversely of said frame and said extension, said depth gage crank axle having an upstanding actuating arm and a depending depth wheel supporting arm, a depth wheel journaled upon said depth wheel supporting arm, a bell crank lever pivoted upon said frame rearwardly of said crank axle, a furrow wheel element connected to said bell crank lever, a bar connecting the bell crank lever with said upstanding arm of said crank axle to swing said crank axle with the movement of said furrow wheel element to limit the cutting depth of the plow elements, and means adjustably connecting the bar to the upstanding actuating arm for regulating the position of the gage wheel relative to the furrow wheel element.

3. An apparatus as defined in claim 2, wherein a second crank axle is carried by said frame, said second crank axle having a crank arm, a flexible connection securing said bar to said last mentioned crank arm, and a power lift wheel carried by said second crank axle.

References Cited in the file of this patent
UNITED STATES PATENTS

| | | |
|---|---|---|
| 1,962,349 | Johnson | June 12, 1934 |
| 2,179,528 | Strandlund | Nov. 14, 1939 |
| 2,406,484 | Allen | Aug. 27, 1946 |
| 2,407,094 | Morkoski | Sept. 3, 1946 |
| 2,518,363 | Orelind | Aug. 8, 1950 |

FOREIGN PATENTS

| | | |
|---|---|---|
| 26,260 | France | May 8, 1923 |